M. P. NORTON.
Car Brake.
2 Sheets—Sheet 1.
No. 11,904.
Patented Nov. 7, 1854.
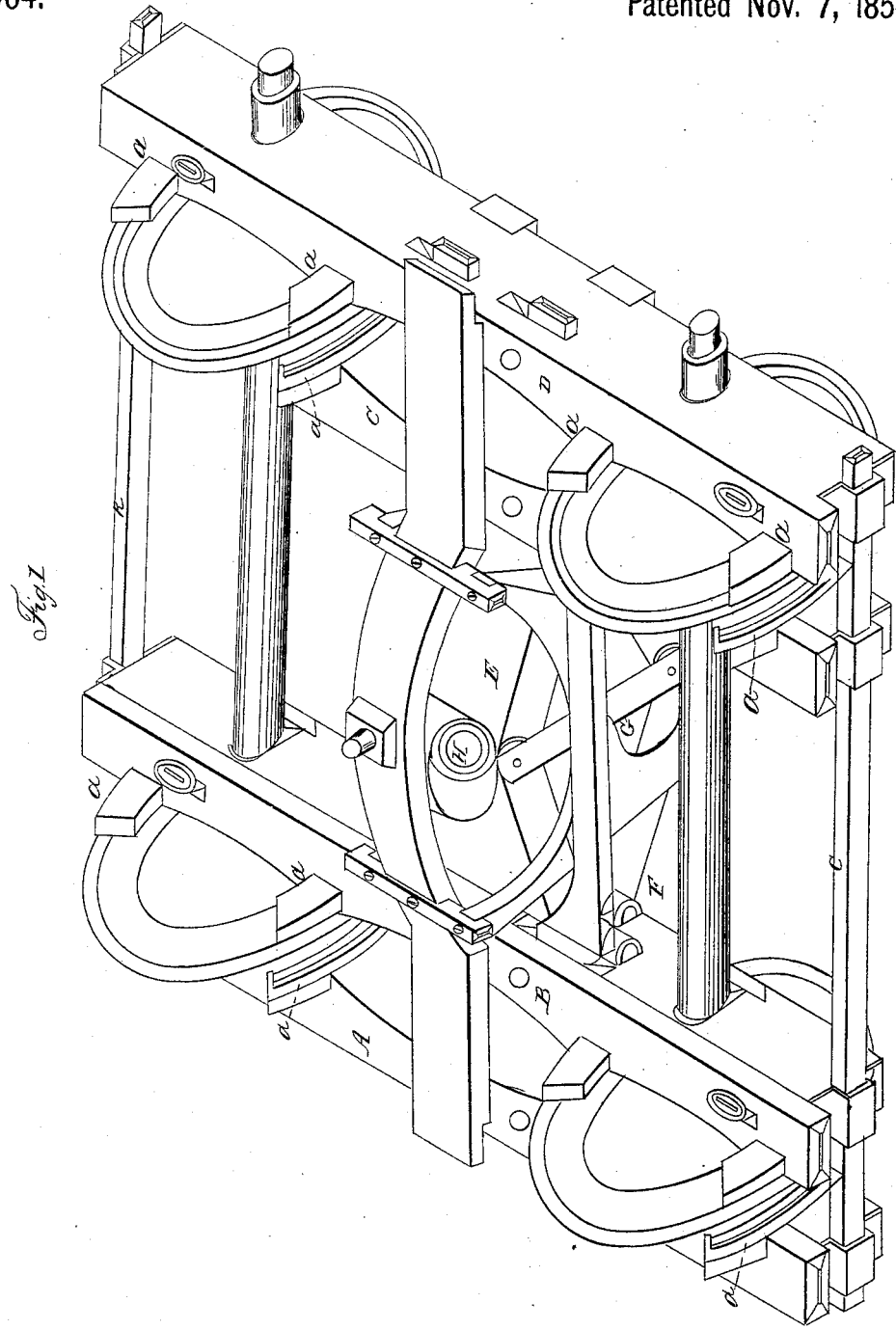
Witnesses.
Inventor.
Marcus P Norton M. P. NORTON.
Car Brake.
No. 11,904.
2 Sheets—Sheet 2.
Patented Nov. 7, 1854.
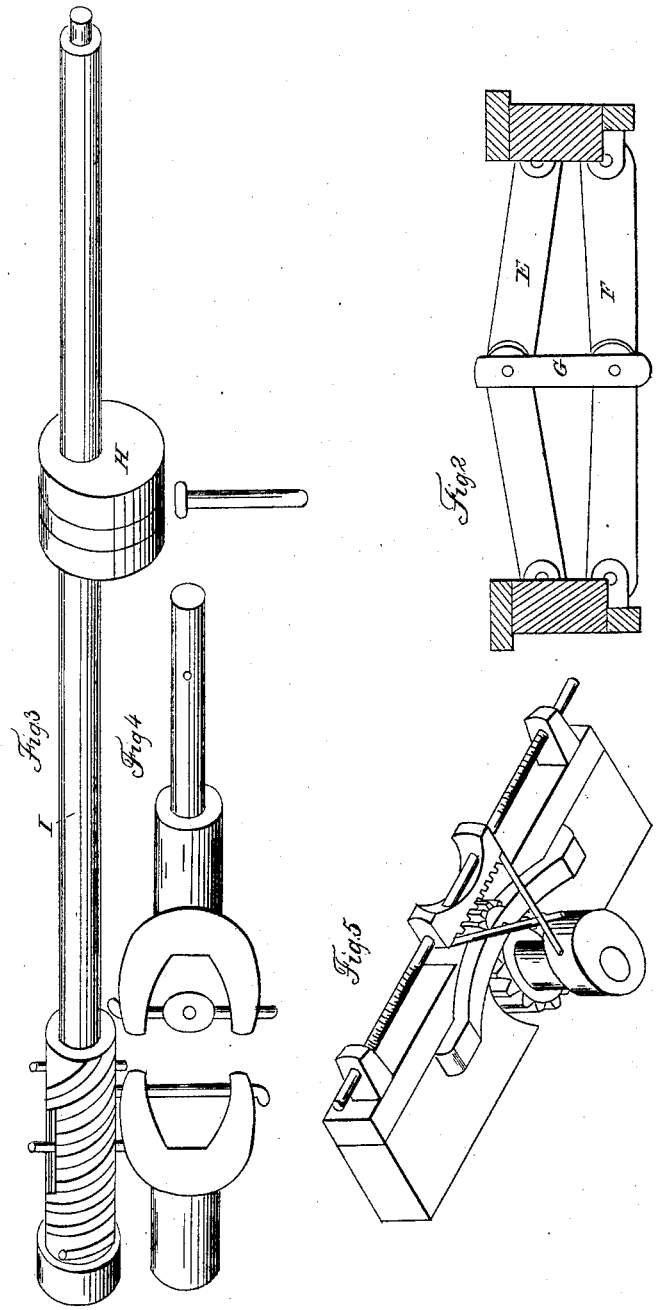
Witnesses
Inventor:
Marcus P. Norton

UNITED STATES PATENT OFFICE.

MARCUS P. NORTON, OF TINMOUTH, VERMONT.

RAILROAD-CAR BRAKE.

Specification of Letters Patent No. 11,904, dated November 7, 1854.

*To all whom it may concern:*

Be it known that I, MARCUS P. NORTON, of Tinmouth, in the county of Rutland and State of Vermont, have invented an Improvement in Railroad-Car Brakes, of which the following is a full and exact description, reference being had to the accompanying drawings and to the letters of reference marked thereon.

A, B, C and D, (Figure 1) are four parallel bars of timber, through which the axles of the car wheels, (prolonged externally for that purpose,) pass and sustain them. They slide freely on the axles to and from the wheels, alongside of which they lie in pairs, each pair embracing the two wheels on one side of the truck. The inside ones (B and C,) are moved by raising or depressing the toggle jointed lever or bar E, (Figs. 1 and 2) to the ends of which they are attached, and the outside ones A and D are moved in like manner by the similar bar F. The two bars are connected by the bar G (Figs. 1 and 2) so that when one is straightened the other is bent, and, by one motion, the outside bars A and D are drawn inward, and the inside bars B and C are pushed outward, and both pairs against the wheels, which are pressed between them.

If each outside bar is connected by rods to the inside bar on the opposite side of the truck (A to C and D to B,) when the inside bars are pressed by the bar E outward against the wheels, they will draw the outside bars inward against the wheels, so that the lower toggle bar F may be dispensed with.

The toggle bars E and F are pressed down by turning the eccentric cam H (Figs. 1 and 3) which is directly under the pivot on which the car rests. In the surface of this cam a groove is turned (as in Fig. 3) in which the head of a bolt slides freely as the cam turns between two guide plates screwed on the edges of the groove which retain the bolt; and the bolt, being also secured to the toggle bar E, raises up both that and the bar F, and thus withdraws the bar A, B, C and D from the wheels. As the bolt plays freely in the groove of the cam, the truck turns under the car without impediment.

The cam H is carried by a brake rod I (Fig. 3) which turns in lugs secured to the truck frame, or to the car. This brake rod may be either connected with the usual apparatus at the end of the car, or turned by a band and pulley above. Or all the brake rods in a train may be connected by means of universal joints (Fig. 4) and carried by power derived from the engine.

Beyond the lug the brake rod is made into a tube, into which that part of the brake rod, which carries the universal joint, enters, and, as the cars approach each other or recede, plays freely back and forth, but is prevented from turning in the tube by a pin which runs through it, and slides in a slot in the tube. To keep these parts steady a spiral spring is carried around the tube from this pin as it projects through the slot to another pin upon the tube.

The bars A, B, C and D are not intended to press directly upon the car wheels, but carry for that purpose the rubbers $a$, $a$, $a$, &c. (Fig. 1). These rubbers are fastened to slides that lie upon the top of the bars, to which they are secured by bolts. The bolts pass through slots in the slides and permit them to be moved back and forth upon the bars. The rubbers are so arranged upon the slides that when one set press against the fore part of the car wheel, the other set is removed behind and beyond the wheels and cannot touch them. The design of this is that the wheels shall be pressed or pinched between the rubbers only at the forward part, that which is turning toward the rail. If they pressed against the hinder part, the wheel would raise them and the cars, and jar if not displace them. When the motion of the cars is reversed, the slides are moved backward, so that the other set of rubbers are brought against what then becomes the forward part of the wheel, and the set before in operation are removed from it.

The slides may be moved by hand, whenever the motion of the cars is reversed, or they may be connected by some simple contrivance, (like that shown in Fig. 5) with the car wheels, so that which ever end of the car moves forward, the slides shall be moved in a contrary direction, subjecting the forward part of the wheels only to the action of the rubbers.

The bars A, B, C and D may be connected together by bars K and L (Fig. 1) passing freely through strong iron staples secured on their ends. By means of these the car wheels will be kept in their place and continue to serve even should the axles break.

What I claim as my invention and desire to secure by Letters Patent is—

The arrangement of machinery above described by which the action of the rubber or rubbers is confined to that part of the car wheel which, as the car is moving, is forward and moving downward; and when the direction of the car is reversed, brings another rubber or set of rubbers, to act upon the other side of the wheel, which is then, in like manner, forward and moving downward.

MARCUS P. NORTON.

Winesses:
S. H. HODGES,
J. B. BEAMAN.